United States Patent

[11] 3,613,056

[72] Inventors Andrew Henry Bobeck
Chatham;
Paul Herman Schmidt, Chatham; Edward Guerrant Spencer, Murray Hill; Le Grand Gerard Van Uitert, Morris Township, Morris County; Edward Martin Walters, Somerset, all of N.J.

[21] Appl. No. 30,072
[22] Filed Apr. 20, 1970
[45] Patented Oct. 12, 1971
[73] Assignee Bell Telephone Laboratories, Incorporated Murray Hill, Berkeley Heights, N.J.

[54] MAGNETIC DEVICES UTILIZING GARNET COMPOSITIONS
7 Claims, 4 Drawing Figs.

[52] U.S. Cl. ....................................................... 340/174TF, 252/62.57, 340/174 ZB, 340/174 CC, 340/174 NA, 340/174 SR
[51] Int. Cl. ....................................................... G11c11/14, G11c 19/00
[50] Field of Search ........................................... 340/174 TF, 174 SR, 174 CC, 174 ZB, 174 NA; 252/62.57

[56] References Cited

UNITED STATES PATENTS

| | | | |
|---|---|---|---|
| 3,444,084 | 5/1969 | Geller et al. .................. | 252/62.57 |
| 3,193,502 | 7/1965 | Schieber ....................... | 252/62.5 |
| 3,291,740 | 12/1966 | Espinosa et al. .............. | 252/62.57 X |
| 3,425,666 | 2/1969 | Lindquist et al. ............. | 252/62.57 X |
| 3,496,108 | 2/1970 | Kolb et al. .................... | 252/62.57 |

*Primary Examiner*—Stanley M. Urynowicz, Jr.
*Attorneys*—R. J. Guenther and Edwin B. Cave

ABSTRACT: Uniaxial magnetic anisotropy in supposedly isotropic garnet compositions is found to be related to growth direction of the crystal. Wafers cut from crystalline sections, selected such that growth direction is consistent with formation of but a single 211 face, are usefully incorporated in bubble domain devices—a class of magnetic devices in which information is represented by enclosed single domain regions of polarity opposite to that of immediately surrounding material.

INVENTORS A. H. BOBECK
P. H. SCHMIDT
E. G. SPENCER
L. G. VAN UITERT
E. M. WALTERS

BY George S. Indig
ATTORNEY

MAGNETIC DEVICES UTILIZING GARNET COMPOSITIONS

BACKGROUND OF THE INVENTION

1. Field of the Invention

The invention is concerned with magnetic "bubble" devices. Such devices, which depend for their operation on the nucleation and/or propagation of small enclosed magnetic domains of polarization opposite to that of the immediately surrounding material, may perform a variety of functions including switching, memory logic, etc.

2. Description of the Prior Art

The last 2 years has seen significant interest develop in a class of magnetic devices known generically as "bubble" domain devices. Such devices described, for example, in *IEEE Transactions Vol. Mag.*-5 (1969) pp. 544–553 are generally planar in configuration and are constructed of materials which have magnetically easy directions essentially perpendicular to the plane of the structure. Magnetic properties, e.g., magnetization, anisotropy, coercivity, mobility, are such that the device may be maintained magnetically saturated with magnetization in a direction out of the plane and that single domain small localized regions of polarization aligned opposite to the general polarization direction may be supported. Such localized regions, which are generally cylindrical in configuration, represent memory bits. Interest in devices of this nature is, in large part, based on high-bit density. Such densities, which are expected to reach $10^5$ bits or more per square inch off wafer, are, in turn, dependent on the ability of the material to support such localized regions of sufficiently small dimension.

In a particular design directed, for example, to a $10^6$-bit memory, bubble domains of the order of one-third mil in diameter are contemplated. A $10^5$-bit memory may be based on stable domains three times greater, and a $10^7$-bit memory requires stable bubble domains three times smaller.

To date, one of the more significant obstacles to commercial realization of such devices has been the material limitation. The first problem has been a practical one, i.e., growth of sufficiently large crystals which are sufficiently defect-free, show physical and chemical stability, etc. An equally significant problem is more fundamental. Materials of requisite uniaxial anisotropy have generally been lacking in some aspect. For example, reported operating devices have generally been based on rare earth orthoferrites. While it is quite likely that orthoferrite bubble devices will go into commercial use, usual orthoferrite composition presents an obstacle to development of high-bit density design.

In general, orthoferrites are of such magnetic characteristics as to make difficult the support e.g., bubble domains smaller than about 2 mils in diameter. In usual magnetostriction, this implies a maximum bit density of the order of $10^5$ bits per square inch.

Attempts to reduce stable domain size at usual operating temperatures have posed fresh problems, e.g., operation near the magnetic reorientation temperature reduces bubble size but results in high magnetostriction, thereby complicating both fabrication and operation. Operation near the reorientation temperature also implies a large temperature dependence of bubble size in turn requiring close temperature control of devices utilizing such compositions. Further, despite emphasis of growth techniques for orthoferrites, materials to date have not been of sufficient crystalline perfection to permit expedient commercial fabrication.

A second class of materials that has received some attention for use in bubble devices is the hexagonal ferrite (e.g., the magnetoplumbites). Magnetic characteristics of these materials are such as to permit support of exceedingly small bubble domains. In fact, the problem has been the reverse of that for the orthoferrites and composition modifications have often been in a direction such as to increase rather than decrease bubble size.

At this time, magnetoplumbites are not considered to be very promising bubble materials, largely because of another limitation, i.e., low mobility. This term refers to the speed with which a bubble may be propagated within the material for a given applied field. Since most devices rely on bubble movement for the performance of the various design functions, low mobility is considered a significant hindrance.

Several approaches have been taken to improve mobility in hexagonal ferrites and various of these have met with some degree of success. While it is possible that such materials with appropriate device characteristics will evolve, the quest continues for classes of materials that have no such inherent limitations.

The past decade has seen substantial device interest in a third class of magnetic materials. These materials, first announced in 1956 (see *Compte Rendue*, Vol. 242, p. 382) are insulating ferrimagnets of the garnet structure. The best known composition is yttrium iron garnet, $Y_3Fe_5O_{12}$, sometimes referred to simply as YIG. Compositional variations are many and include complete or partial substitution by various of the 4*f* rare earths for yttrium, partial substitution of aluminum or gallium for iron, and others. Growth habits of these materials are well understood and many techniques exist for producing large crystals of high perfection.

X-ray studies and fundamental structural considerations have always indicated the magnetic garnets to be magnetically isotropic. From this standpoint, garnets have not been natural indicators for bubble devices which require uniaxial magnetic anisotropy. However, virtually from their inception, workers concerned with the garnets have observed regions of magnetic anisotropy. In general, little attention has been paid to such anisotropy and literature references to this phenomenon generally invoke a bulk strain mechanism. On some occasions, the anisotropy has been attributed to surface strain due, for example, to grinding and/or polishing.

Frustrations growing out of the inadequacies of the orthoferrites and hexagonal ferrites have prompted study of the magnetic garnets for use in magnetic devices. To produce the needed uniaxial magnetic anisotropy, the garnet samples chosen for these studies have been deliberately strained. While many of the magnetic properties look promising the very dependence on strain is attended by difficulties both in processing and in operation. Operation in strained materials is often limited by a nonuniformity in the induced anisotropy by a high coercivity, and also by variation of such properties with time.

SUMMARY OF THE INVENTION

In accordance with this invention, crystals of a class of garnet compositions are so cut that the resulting wafers manifest a substantial uniform uniaxial magnetic anisotropy generally normal to the wafer face. While resort must be had to the detailed description to adequately set forth the complete selection rules and other parameters yielding this result, the inventive concept may be summarized as follows.

Garnet compositions found to manifest desirable unique, easy magnetization direction characteristics contain at least two different types of ions in the dodecahedral sites. To meet this requirement, such ions, referred to as A ions and B ions, must each be present in amount of at least 10 atom percent of the total number of ions occupying such sites.

Cutting direction is found to depend on the relative size and magnetostriction (both sign and magnitude are pertinent) of the two relevant ions.

It has been found that useful cutting direction is related to growth direction of the crystal. This implies that the portion of crystal under consideration was grown under such conditions as to yield but a single free facet (although a special condition exists under which a segment yielding three facets may be usefully employed). While the relationship between uniaxial anisotropy and growth direction applies to all crystal segments showing uniform growth direction, segments of primary interest, for the purpose of this invention, are those yielding {211} faces.

Useful cutting directions within such preferred segment classes are two in number and each is related to a particular <111> axis. The first axis to be discussed is that lying most nearly normal to the free {211} facet and crystal planes parallel thereto. For purposes of this invention, cuts related to this <111> are referred to as "type I." The second cut of concern is related to a <111> axis lying in the plane of the free {211} facet. Such cuts are referred to as "type II." In either case, wafers are cut substantially normal to the <111> of concern (a useful type I cut which may conserve material is a {211} which is therefore about 20° off normal).

Determination as to whether the cut should be such as is defined as type I or type II is based on relative size and the nature of the magnetostriction of the pure $(A,B)_3Fe_5O_{12}$ compounds corresponding to the A or B ion of concern. For this simple case, if the larger ion has a positive magnetostriction sign in the <111> direction while the smaller is negative, the cut is type I. The opposite results in the type II cut, i.e., the larger ion is negative, while the smaller is positive. Useful cuts may utilize ions of the same magnetostriction case as well as three or more ions and this is discussed in the detailed description.

DETAILED DESCRIPTION

1. Compositional Considerations

Figure 1:
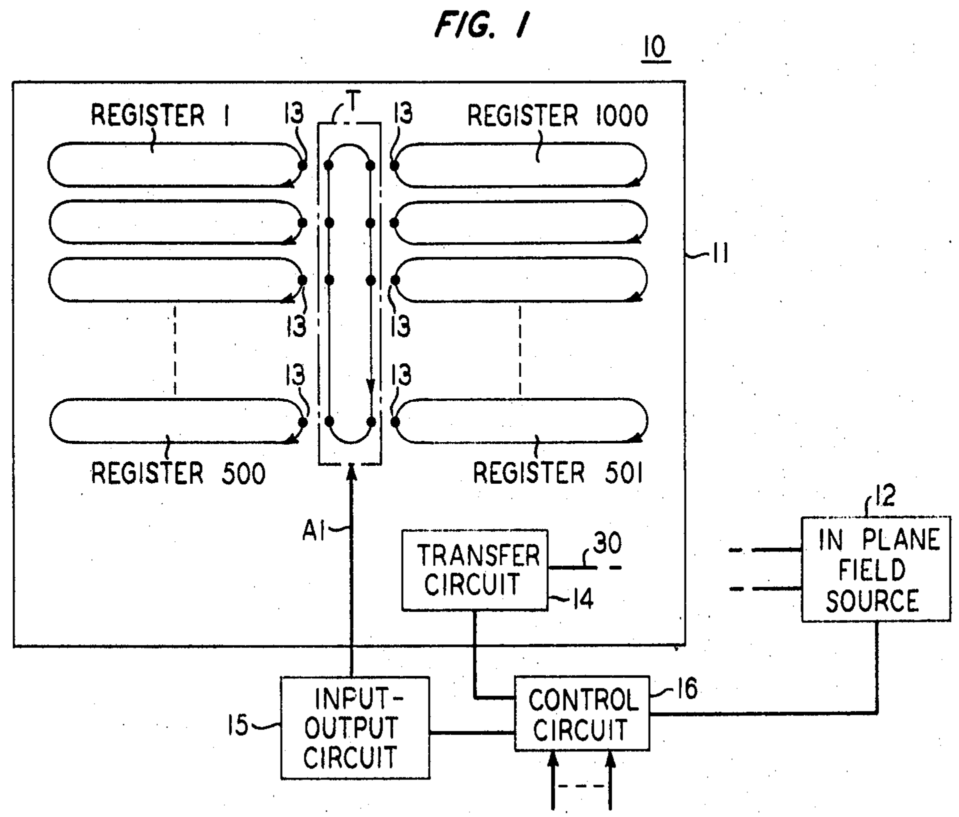
FIG. 1 is a schematic diagram of a recirculating memory in accordance with this invention.

Garnets suitable for the practice of the invention are of the general stoichiometry of the prototypical compound $Y_3Fe_5O_{12}$. This is the classical yttrium iron garnet (YIG) which, in its unaltered form, is ferrimagnetic with net moment being due to the predominance of three iron ions per formula unit in the tetrahedral sites (the remaining two iron ions are in octahedral sites). In this prototypical compound, yttrium occupies a dodecahedral site and the primary composition requirement, in accordance with the invention, is concerned with the nature of the ions in part or in whole replacing yttrium in the dodecahedral sites.

The fundamental requirement for assurance of a wafer manifesting essentially homogeneous uniaxial anisotropy substantially normal to the surface is that the dodecahedral site be occupied by at least two different ions. For the purpose of this invention, each of these ions referred to as A ions and B ions must be present in amount of at least 10 atom percent based on the total number of ions occupying dodecahedral sites. Ions which may occupy such sites in amount of at least 10 percent include $Y^{3+}$, $Lu^{3+}$, $La^{3+}$ and the trivalent ions of any of the 4*f* rare earths as well as ions of other valence states such as $Ca^{2+}$. Such ions are sometimes introduced for charge compensation, for example, where ions of valence state other than 3+ are substituted in part for iron. Compositions containing all such ions have been studied extensively and are reported, see, for example, *Handbook of Microwave Ferrite Materials*, Ed. by Wilhelm H. Von Aulock, Academic Press, New York (1965).

A further requirement pertains to the size and nature of the magnetostrictive contribution of the A and B ions in the <111> crystal directions. The simplest case concerns A and B ions that induce opposite magnetostrictive signs in this sense.

The following table is a computation of date presented in Vol. 22, *Journal of the Physical Society of Japan*, p. 1201 (1967). This table presents the magnetostrictive values in dimensionless units representing centimeters change per centimeter of length for $R_3Fe_5O_{12}$ garnet compositions. The trivalent A or B ions are ranked in order of decreasing size.

TABLE I

| (A,B)ion | λ<111> | λ<100> |
|---|---|---|
| Sm | $-8.5\times10^{16}$ | $+21\times10^{16}$ |
| Eu | $+1.8\times10^{16}$ | $+21\times10^{16}$ |
| Gd | $-3.1\times10^{16}$ | zero |
| Tb | $+12.0\times10^{16}$ | $-3.3\times10^{16}$ |
| Dy | $-5.9\times10^{16}$ | $-12.5\times10^{16}$ |
| Ho | $-4.0\times10^{16}$ | $-3.4\times10^{16}$ |
| Er | $-4.9\times10^{16}$ | $+2.0\times10^{16}$ |
| TM | $-5.2\times10^{16}$ | $+1.4\times10^{16}$ |
| Yb | $-4.5\times10^{16}$ | $+1.4\times10^{16}$ |
| Lu | $-2.4\times10^{16}$ | $-1.4\times10^{16}$ |
| Y | $-2.4\times10^{16}$ | $-1.4\times10^{16}$ |

Where the larger of the two ions is positive and the smaller is negative, the cut is type I. Where the larger has a negative magnetostrictive sign in such direction and the smaller a positive, the cut is type II.

EXAMPLES

The following examples are illustrative of type I and type II garnets.

Type I
$TbEr_2AlFe_4O_{12}$
$Eu_2ErGa_{0.7}Fe_{4.3}O_{12}$
$Tb_{0.75}Y_{2.25}Ga_{0.9}Fe_{4.1}O_{12}$
Type II
$Gd_{2.34}Tb_{0.66}Fe_5O_{12}$
$Gd_{2.325}Tb_{0.585}Eu_{0.09}Fe_5O_{12}$ Where the larger of the two ions is positive and the smaller is negative, the cut is type I. Where the larger has a negative magnetostrictive sign in such direction and the smaller a positive, the cut is type II.

Examples

The following examples are illustrative of type I and type II garnets.

Type I
$TbEr_2AlFe_4O_{12}$
$Eu_2ErGa_{0.7}Fe_{4.3}O_{12}$
$Tb_{0.75}Y_{2.25}Ga_{0.9}Fe_{4.1}O_{12}$
Type II
$Gd_{2.34}Tb_{0.66}Fe_5O_{12}$
$Gd_{2.325}Tb_{0.585}Eu_{0.09}Fe_5O_{12}$ It is also possible to obtain useful material where both the A and B ions induce a <111> magnetostriction of the same sign, providing that their contribution to magnetostriction in the <111> directions is different. Stated in other terms, if the signs are the same, it is a requirement that the product of the number of A ions and its magnetostrictive magnitude be different from that of the same product for the B ions. Where the magnetostrictive sign is the same (always considering <111> directions), if both ions are positive the cut is type I if the contribution (i.e., the $\lambda_{111}\times$ concentration product) of the larger ion is greater; the cut is type II for the reverse relation. The cut may also be type I if both ions are negative and the contribution of the smaller is greater. It may be type II if the converse applies.

For the more complex case in which there are more than two ions in the dodecahedral sites, it is necessary to consider the responsible mechanism. The following postulated mechanism is sufficient basis for determining the required magnetostrictive and size characteristics. This mechanism is not intended to explain the existence of a uniaxial anisotropy, per se, and this fundamental phenomenon is still somewhat in doubt. It is sufficient to recognize that different size ions in equivalent sites are under stress, the larger being under compression and the smaller being under tension. Where a magnetostrictive sign is different in a given direction (in this instance <111>> directions), the effect of the stress is cooperative and the induced easy direction is the same for both ions. Where the sign of the magnetostriction of two ions is the same, they oppose each other in the sense that the induced easy directions are orthogonal for the stressed and tensed ions.

For the complex case in which more than two ions occupy dodecahedral sites, it is necessary that the stress-induced anisotropy be a net finite value. Operative compositions for the purpose of this invention may, therefore, be defined generally as those containing two or more ions in the dodecahedral sites with the size and magnetostrictions in the <111> directions being such as to result in an induced anisotropy by reason of the local stress resulting from the size distribution of the dodecahedral ions. The requirement that there be at least two ions each present at amount of at least 10 atom percent on the basis expressed is statistical. The induced anisotropy must be reasonably uniform within any domain wall dimension.

Miscellaneous Requirements

The foregoing is sufficient to assure validity of the inventive assumption in the general case. It has, however, been stated that a firm mechanistic basis for the basic phenomenon of uniaxial magnetic anisotropy in the supposedly "cubic" garnet is not presently available. While such unique magnetization direction invariably results in compositions meeting the above requirements where crystals are properly prepared, it is possible to make even such materials isotropic by high-temperature anneal. It has been observed, for example, that any such composition may be made magnetically cubic by annealing at temperatures of the order of 1,200° C. or greater for periods of several hours. It follows that the crystal growth techniques utilized should not result in such annealing. This is experimentally verified by the observation that initially nucleated portions of crystals grown by dropping temperature techniques that have grown at temperatures substantially in excess of 1,200° C. do not exhibit such uniaxial anisotropy while subsequent portions grown at temperatures below 1,200° C. (and never exposed to temperatures above 1,200° C.) do exhibit the desired property.

It is implicit that material suitable for the inventive use must have the requisite crystalline perfection to permit "bubble" propagation. Growth under conditions such as to substantially avoid crystalline defects which interfere with such propagation has been found to be sufficient assurance of the requisite uniaxial anisotropy.

As described in *IEEE Transactions Vol. Mag-5* (1969) pp. 544–553, bubble diameter varies with magnetic moment as $M^{12}$. This implies a range of magnetization appropriate to sustain bubble domains of a desired size. For usual devices, this, in turn, gives rise to a desired magnetization range of from about 30 gauss to about 500 gauss. Since most garnet compositions in which both tetrahedral and octahedral sites are occupied by iron ions have magnetizations which are in excess of this range, it is often desirable to partially replace some iron. In general, this is accomplished by partial substitution with nonmagnetic ions preferentially occupying tetrahedral sites (the net moment in the prototypical composition is due to the preponderance of iron in these sites). Examples of such ions are $Ga^{3+}$, $Al^{3+}$, $Si^{4+}$, $Ge^{4+}$, and $V^{5+}$. For such preferential occupancy, ionic radii should be equal to or less than 0.62 A.

Such considerations, relative to magnetization, are illustrative only and other modifications may be made to result in moments of the desired magnitude over the intended operating temperature.

While the inventive concept depends on local stress, it is often desirable that the garnet composition manifest a low value of magnetostriction in the <111> direction. This has obvious fabrication advantages in that materials may be bonded to substrates of different expansivity without adverse effect on coercivity which impedes bubble propagation. It also permits a broader latitude of processing techniques. Net finite <100> magnetostriction also impairs domain wall bubble mobility. Appropriate selection of ions in the three-cation sites may result in such desiderata.

Another parameter of practical significance is concerned with the temperature dependence of the foregoing characteristics. It has been determined experimentally that such insensitivity may be measured in terms of variation of magnetization alone (low-temperature dependence of magnetization assuring sufficient insensitivity of other relevant parameters such as crystalline anisotropy, etc.). While simple two-cation garnet compositions frequently show good temperature properties, compositions modified to reduce moment ordinarily do not. Fortunately, it is possible to so select the dodecahedral cations as to minimize the temperature dependence introduced by dilution in the tetrahedral sites.

2. The Figures

Figure 2:
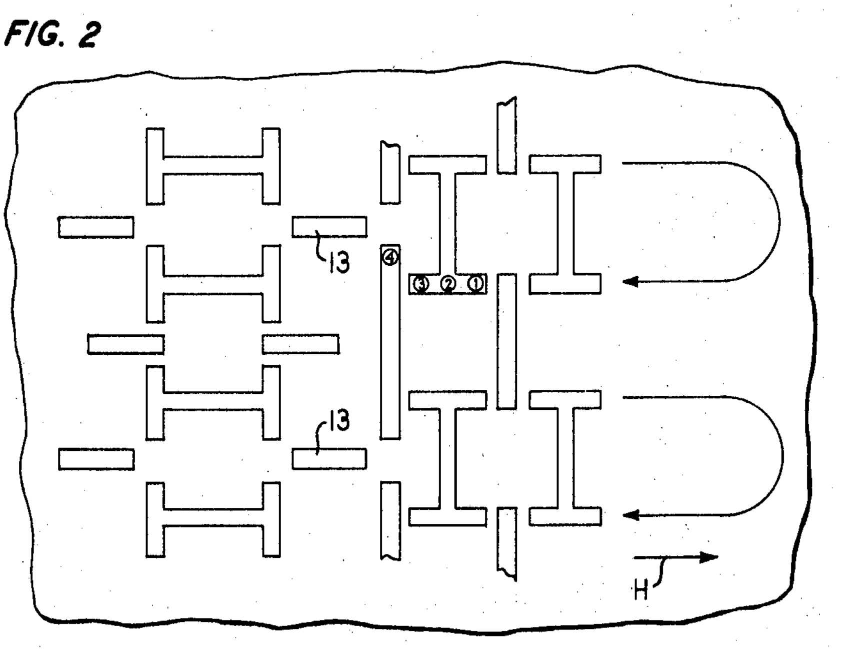
FIG. 2 is a detailed magnetic overlay and wiring configuration for portions of the memory of FIG. 1, showing domain locations during operation.

The device of FIGS. 1 and 2 is illustrative of the class of "-bubble" devices described in *IEEE Transactions on Magnetics, Vol. MAG-5* No. 3, Sept. 1969, pp. 544–553 in which switching, memory, and logic functions depend upon the nucleation and propagation of enclosed, generally cylindrically shaped, magnetic domains having a polarization opposite to that of the immediately surrounding area. Interest in such devices centers, in large part, on the very high-packing density so afforded, and it is expected that commercial devices with from $10^5$- to $10^7$-bit positions per square inch will be commercially available. The device of FIGS. 1 and 2 represents a somewhat advanced stage of development of the bubble devices and include some details which have been utilized in recently operated devices.

FIG. 1 shows an arrangement 10 including a sheet or slice 11 of material in which single wall domains can be moved. The movement of domains in accordance with this invention is dictated by patterns of magnetically soft overlay material in response to reorienting in-plane fields. For purposes of description, the overlays are bar- and T-shaped segments and the reorienting in-plane field rotates clockwise in the plane of sheet 11 as viewed in FIGS. 1 and 2. The reorienting field source is represented by a block 12 in FIG. 1 and may comprise mutually orthogonal coil pairs (not shown) driven in quadrature as is well understood. The overlay configuration is not shown in detail in FIG. 1. Rather, only closed "information" loops are shown in order to permit a simplified explanation of the basic organization in accordance with this invention unencumbered by the details of the implementation. We will return to an explanation of the implementation hereinafter.

The figure shows a number of horizontal closed loops separated into right and left banks by a vertical closed loop as viewed. It is helpful to visualize information, i.e., domain patterns, circulating clockwise in each loop as an in-plane field rotates clockwise. This operation is consistent with that disclosed in the aforementioned application of A. H. Bobeck and is explained in more detail hereinafter.

The movement of domain patterns simultaneously in all the registers represented by loops in FIG. 1 is synchronized by the in-plane field. To be specific, attention is directed to a location identified by the numeral 13 for each register in FIG. 1. Each rotation of the in-plane field advances a next consecutive bit (presence or absence of a domain) to that location in each register. Also, the movement of bits in the vertical channel is synchronized with this movement.

In normal operation, the horizontal channels are occupied by domain patterns and the vertical channel is unoccupied. A binary word comprises a domain pattern which occupies simultaneously all the positions 13 in one or both banks, depending on the specific organization, at a given instance. It may be appreciated, that a binary word, so represented, is fortunately situated for transfer into the vertical loop.

Transfer of a domain pattern to the vertical loop, of course, is precisely the function carried out initially for either a read or a write operation. The fact that information is always moving in a synchronized fashion permits parallel transfer of a selected word to the vertical channel by the simple expedient of tracking the number of rotations of the in-plane field and accomplishing parallel transfer of the selected word during the proper rotation.

The locus of the transfer function is indicated in FIG. 1 by the broken loop T encompassing the vertical channel. The operation results in the transfer of a domain pattern from (one or) both banks of registers into the vertical channel. A specific example of an information transfer of a 1,000-bit word necessitates transfer from both banks. Transfer is under the control of a transfer circuit represented by block 14 in FIG. 1. The transfer circuit may be taken to include a shift register tracking circuit for controlling the transfer of a selected word from memory. The shift register, of course, may be defined in material 11.

Once transferred, information moves in the vertical channel to a read-write position represented by vertical arrow A1 connected to a read-write circuit represented by block 15 in FIG. 1. This movement occurs in response to consecutive rotations of the in-plane field synchronously with the clockwise movement of information in the parallel channels. A read or a write operation is responsive to signals under the control of control circuit 16 of FIG. 1 and is discussed in some detail below.

The termination of either a write or a read operation similarly terminates in the transfer of a pattern of domains to the horizontal channel. Either operation necessitates the recirculation of information in the vertical loop to positions 13 where a transfer operation moves the pattern from the vertical channel back into appropriate horizontal channels as described above. Once again, the information movement is always synchronized by the rotating field so that when transfer is carried out, appropriate vacancies are available in the horizontal channels at positions 13 of FIG. 1 to accept information. For simplicity, the movement of only a single domain, representing a binary one, from a horizontal channel into the vertical channel is illustrated. The operation for all the channels is the same as is the movement of the absence of a domain representing a binary zero. FIG. 2 shows a portion of an overlay pattern defining a representative horizontal channel in which a domain is moved. In particular, the location 13 at which domain transfer occurs is noted.

The overlay pattern can be seen to contain repetitive segments. When the field is aligned with the long dimension of an overlay segment, it induces poles in the end portions of that segment. We will assume that the field is initially in an orientation as indicated by the arrow H in FIG. 2 and that positive poles attract domains. One cycle of the field may be thought of as comprising four phases and can be seen to move a domain consecutively to the positions designated by the encircled numerals 1, 2, 3, and 4 in FIG. 2, those positions being occupied by positive poles consecutively as the rotating field comes into alignment therewith. Of course, domain patterns in the channels correspond to the repeat pattern of the overlay. That is to say, next adjacent bits are spaced one repeat pattern apart. Entire domain patterns representing consecutive binary words, accordingly, move consecutively to positions 13.

The particular starting position of FIG. 2 was chosen to avoid a description of normal domain propagation in response to rotating in-plane fields. That operation is described in detail in the above mentioned application of Bobeck. Instead, the consecutive positions from the right as viewed in FIG. 2, for a domain adjacent the vertical channel preparatory to a transfer operation are described. A domain in position 4 of FIG. 2 is ready to begin its transfer cycle.

Figure 3:
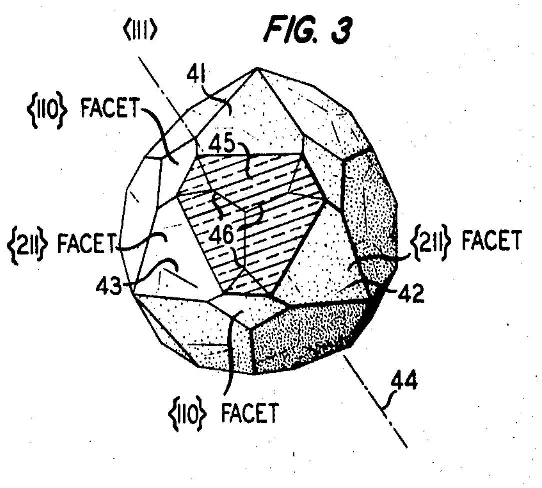
FIG. 3 is a perspective view of a garnet crystal from which type I cuts have already been taken.
Figure 4:
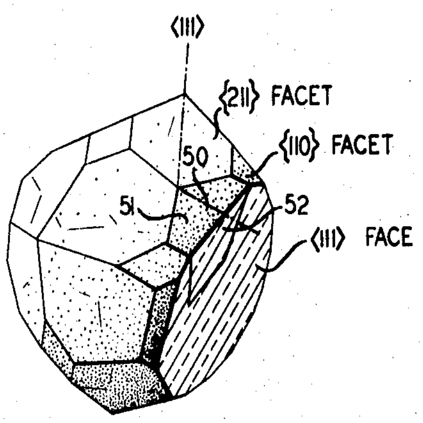
FIG. 4 is a perspective view of a garnet crystal from which type II cuts have already been taken.

FIGS. 3 and 4 depict type I and type II cuts, respectively. The dependence of cutting direction on dodecahedral ion composition has been described. The nature of the type I and type II cuts is discussed in conjunction with these figures.

FIG. 3, depicting the type I garnet, is a perspective view showing three {211} facets from which a number of slices have already been taken. Relevant {211} facets 41, 42, and 43 have a common intercept defined by a <111> axis 44. Slices cut normal to this axis and, therefore, parallel to the exposed plane 45, manifest a unique easy direction of magnetization parallel to this <111> axis and, therefore, substantially normal to the {211} plane (19°28′ off normal). Since plane 45 is, in fact, a <111> crystalline plane, the unique easy direction of magnetization is normal to all parts of this plane. For most device purposes, however, the boundaries 46 defining the planar intercepts of the three segments producing the facets 41, 42, and 43 present some coercivity to domain propagation. Device wafers are preferably selected so as not to include such boundary. Certain device designs, however, do not preclude such inclusion. A somewhat inferior but usable type I cut is the {211} parallel to the {211} facets. Unique easy direction is 19°28′ off normal in such slices and this is sufficient for many device purposes. For this description this is considered "substantially normal."

FIG. 4 is a perspective view depicting the desirable cutting procedure to be used on a type II garnet. In this figure, the <11> direction 50 lying in the plane of the free {211} facet 51 is of concern. Cutting direction is orthogonal to direction 50, and an illustrative wafer face is shown as exposed plane 52. This exposed plane, in turn, defines a <111> plane.

With the sole exception of type I cuts including the described intercepts, both type I and type II cuts are necessarily taken from crystalline portions grown in such a way as to produce but a single (or three adjacent) free facet/s, i.e., {211} facets.

3. Preparatory Techniques

The inventive concept is substantially independent of the growth procedure save that growth at temperature below ≈1,200° C. is essential to ensure ordering conducive to a magnetically uniaxial alignment. (This does not preclude nucleation at higher temperature in a dropping temperature technique since the lower temperature material is matched.) Appropriate crystalline materials may be grown from the flux either spontaneously or on a seed, (see for example *J. Phys. Chem. Solids Suppl.* Crystal Growth Ed. H. S. Peiser (1967 ) pp. 441–444 and *Journal Applied Physics Suppl.* 33, 1362 (1962)), hydrothermally (see *j. Am. Ceram. Soc.* 45, 51 (1962)). 211 or 111 facets are desirably used for seeded growth. In certain instances it may be advantageous to employ cuts parallel to the 211 growth facet to conserve material. In others 111 cuts may be preferred since the axis of magnetic alignment is then ⊥ to the cut plane.

What is claimed is:

1. Memory device comprising a body of material capable of evidencing uniaxial magnetic anisotropy capable of supporting local enclosed regions of magnetic polarization opposite to that of surrounding material and provided with means for positioning such oppositely polarized local enclosed regions, in which said material is ferrimagnetic, characterized in that the said material is of the garnet structure and in that the dodecahedral sites in the said material are occupied by at least two different ions each present in amount of at least 10 atom percent based on the total number of ions occupying such dodecahedral sites, said ions being selected from the group consisting of $Y^{3+}$, $Lu^{3+}$, $La^{3+}$ and the trivalent ions of the 4*f* rare earths, and in that said body is a wafer, the larger plane of which substantially defines a crystallographic <111> plane, said wafer being selected from a crystalline portion all of which was grown in such manner as to result only in {211} facets.

2. Device of claim 1 in which the said wafer substantially defines a crystallographic <111> plane which corresponds to the <111> direction lying within the plane of a {211} facet.

3. Device of claim 2 in which the dodecahedral sites are substantially occupied by but two different ions, the larger of the said ions has a negative sign of magnetostriction and the smaller of the said ions has a positive sign of magnetostriction both signs relative to the <111> axis.

4. Device of claim 1 in which the said wafer substantially defines a crystallographic <111> plane normal to the <111> direction forming the common intercept of three crystal segments each containing a single facet defining a {211} plane.

5. Device of claim 4 in which the dodecahedral sites are substantially occupied by but two different ions the larger of which has a positive sign of magnetostriction in the <111> axes and the smaller of which has a negative sign of magnetostriction in the <11> axes.

6. Device of claim 1 in which the net effect of the said ions that occupy the dodecahedral sites are of such nature as to produce an easy magnetization direction parallel to a direction of strain.

7. Device of claim 1 in which the net effect of the said ions that occupy the dodecahedral sites are of such nature as to produce an easy magnetization direction normal to the direction of strain.